United States Patent [19]

Weger et al.

[11] Patent Number: 5,773,555
[45] Date of Patent: Jun. 30, 1998

US005773555A

[54] METHOD AND APPARATUS FOR THE PRODUCTION OF POLYAMIDES

[75] Inventors: Friedrich Weger; Rainer Hagen, both of Berlin, Germany

[73] Assignee: Karl Fischer Industrieanlagen GmbH, Berlin, Germany

[21] Appl. No.: 614,497

[22] Filed: Mar. 13, 1996

[30] Foreign Application Priority Data

Mar. 14, 1995 [DE] Germany .......................... 195 10 698.9

[51] Int. Cl.$^6$ .............................. C08G 69/08; C08G 73/10
[52] U.S. Cl. ..................... 528/310; 528/315; 528/318; 528/323; 528/324; 528/329.1; 528/332; 528/480; 528/488; 528/499
[58] Field of Search ..................... 528/480, 488, 528/499, 310, 323, 324, 329.1, 315, 318, 332

[56] References Cited

U.S. PATENT DOCUMENTS

| | | | |
|---|---|---|---|
| 3,031,433 | 4/1962 | Monroe | 528/310 |
| 3,155,637 | 11/1964 | Reichold et al. | 525/420 |
| 3,307,271 | 3/1967 | Simpson | 34/468 |
| 3,480,596 | 11/1969 | Simons | 528/335 |
| 3,634,357 | 1/1972 | Stewart et al. | 528/283 |
| 3,821,171 | 6/1974 | Beaton | 528/481 |
| 4,755,590 | 7/1988 | Kubanek et al. | 528/503 |

FOREIGN PATENT DOCUMENTS

| | | |
|---|---|---|
| 0284968A1 | 3/1988 | European Pat. Off. . |
| 0703264A2 | 3/1996 | European Pat. Off. . |
| 91566 | 7/1972 | Germany . |
| 2723549A | 12/1978 | Germany . |
| 3033468 | 6/1982 | Germany . |
| 215099 | 10/1984 | Germany . |
| 1044128 | 9/1966 | United Kingdom . |

*Primary Examiner*—P. Hampton-Hightower
*Attorney, Agent, or Firm*—Marshall & Melhorn

[57] ABSTRACT

There are proposed a method and a device for manufacturing polyamides, in which polyamide granulate manufactured by polycondensation in the molten mass is after-condensed in the solid phase, being heated. The polyamide granulate is heated in one step to a first temperature of between 70° C. and 150° C., and held for a predetermined period of time at this temperature, and then, in a second step, is heated to a second higher temperature, however lying beneath the melting point, and is after-condensed at this temperature, until the desired average degree of polycondensation is achieved.

14 Claims, 3 Drawing Sheets

METHOD AND APPARATUS FOR THE PRODUCTION OF POLYAMIDES

FIELD OF THE INVENTION

The invention relates to a method of manufacturing polyamides according to the preamble of the main claim, and to a device for carrying out this method.

BACKGROUND OF THE INVENTION

Polyamides are predominantly manufactured on an industrial scale by polycondensation in the molten mass. During polycondensation, the chain length of the polymer and thus the viscosity of the molten mass increases intensely. Thereby the thickness of the coatings of molten material adhering to the reactor walls and components increases, the thermal decomposition of the polymer has increasing influence, and the product quality decreases. For this reason polycondensation in the molten mass is interrupted at a chain length of the polymer at which the thermal decomposition begins to make itself disruptive.

For many applications, products are required with a greater chain length than may be achieved in this way, for example for the extrusion of films, profiles and tubes and semi-finished products. In order to manufacture such products, polymer granulate which has been produced by polycondensation in the molten mass is subjected to after-condensation in the solid phase. In this process the polyamide, in the form of granulate or powder, is heated to a temperature between 10° C. and approximately 60° C. beneath its melting point, and the by-products of polycondensation occurring are removed by the application of vacuum or by passing inert gas through the granulate.

On an industrial scale, the solid phase after-condensation is carried out continuously in fluidised bed reactors or intermittently in vacuum, tumbler or biconical reactors. In the fluidised bed reactor the polymer granulate, as a coherent bulk material, flows in a shaft in counterflow to inert gas. The granulate is introduced to and removed from the reactor in a continuous flow. The tumbler or biconical reactor comprises a heatable rotating container which is supplied with the granulate and from which the granulate is again removed after expiry of the reaction period. In order to remove the by-products, vacuum is applied to the container during the reaction.

During the solid phase after-condensation of polyamides it is conventional to heat the granulate directly to the desired after-condensation temperature, either indirectly on heated surfaces or directly in a hot flow of inert gas. It is desirable to have the concentrate pass through the temperature range between ambient temperature and after-condensation temperature as rapidly as possible, in order with a predetermined cycle time (intermittent after-condensation) or a predetermined reactor volume, to operate the installation at maximum efficiency. Occasionally a slower heating rate than the maximum possible is accepted, in order to achieve uniform heating of the granulate.

During conventional procedures, many polyamides separate not only water as a by-product but also oligomers. These involve attendant materials in the polymer, which have already arisen during polycondensation of the molten mass. At the temperatures of solid phase after-condensation, the oligomers in particular migrate with a low molecular mass by diffusion on to the surface of the polymer particles. Due to their not inconsiderable vapour pressure at the reaction temperatures, they pass by sublimation into the gas phase. At the points of the installation with lower temperatures, they again desublimate and form adhering deposits whose thickness grows continuously.

This behaviour makes itself particularly unpleasantly apparent in the fluidised bed reactor. For reasons of cost, the inert gas used must be circulated. The gas circuit contains various pieces of apparatus and machines in order to clean the inert gas of the vaporous reaction by-products and penetrated atmospheric oxygen, and to circulate and heat the contents. The oligomers brought along with the inert gas would in a short time make this apparatus unusable, if it were not removed from the gas. Various measures are conventional for this purpose. In many cases it is sufficient to clean the inert gas after it leaves the reactor with a bag filter, the entrained oligomers being separated as a fine dust. Bag filters however tend to block easily if polymers desublimate in the filter cloth and cannot be removed from that point by cleaning. Also it is often not possible to separate the oligomers totally. A residue remains in the inert gas and contaminates the subsequent apparatus and machines, even if after a certain period of time.

A more frequently used method is gas washing with a liquid which is not disruptive in the process. In the case of polyamides, such a liquid is for example water. In this case the contaminated inert gas is cooled with the liquid, the oligomers desublimate and pass into the liquid. A disadvantage here is also incomplete separation of the fine dust and the necessity to clean the wash liquid itself, which is to a large extent circulated, for example by filtration. The filter sludge occurring can in addition cause problems of disposal.

The fact that the named cleaning methods do not enable total cleaning and despite this the installations become contaminated over a long period, has led to the introduction of catalytic gas cleaning. The inert gas containing oligomers and by-products is heated to approximately 400° C., and with the introduction of air is passed through a catalyst bed. At this point the organic impurities burn away totally, forming carbon dioxide and water. No contamination can enter the subsequent portions of the installation. This advantage is paid for by an increased use of energy and higher investment costs for apparatus, catalyst and regulating means.

Oligomer deposits also render intermittent more difficult solid-phase after-condensation in the tumbler or biconical reactor. Deposits form on the inner walls of the reactor, the pipelines and in the entire vacuum system. Production in these installations must be frequently interrupted in order to carry out cleaning operations. This incurs costs through loss of production, cleaning operations and a product which does not meet specifications.

For many applications polyamides are required with a particularly low content of materials which are extractable by water or methanol. Such materials are predominantly monomers and oligomers. Thus PA66, with a reduced oligomer content, is more suitable for spinning and drawing yarns. Fewer deposits form on galettes and thread guidance means, fewer thread breakages result, and a higher product yield and greater economy of the spinning process is obtained. At the same time fewer problems occur in further processing of the yarns, for example during dying, texturising or finishing of the textile web, etc.

Fewer deposits also occur due to sublimated oligomers on the spinning nozzles, so that the conventional vapour film formation can be omitted.

Low-oligomer polyamide 66 opens up new areas of application for this polymer. Films and vessels for packaging of products may be produced therefrom, in which a minimum amount of foreign matter can enter. This is of particular importance in the medical field, in packaging of infusion solutions and blood replacement materials as well as blood derivatives. This is also important in packaging of high-purity chemicals, for example for chromatography processes, spectral analysis, etc. Finally, low-oligomer PA66 is more suitable for packaging of foodstuffs and confectionery, as it contains fewer oligomer components which are capable of migration.

SUMMARY OF THE INVENTION

The object of the invention is to provide a method for manufacturing polyamides with a reduced content of sublimatable oligomers by polycondensation in the solid phase, in which, during the solid phase after-condensation, oligomer deposits in the reactor, in the connected pipelines, apparatus and machines no longer occur, or only to a very small degree. It is also the object of this invention to provide a device for continuously carrying out the said method.

This object is fulfilled according to the invention by the characterising features of the main claim in conjunction with the features of the preamble.

By means of the measured indicated in the sub-claims, advantageous further developments and improvements are possible.

According to the invention, the solid phase after-condensation is carried out successively at two different temperature levels. In the first step the granulate is heated to a temperature at which low-molecular oligomers, appearing through chemical reactions with the polymer chain, are decomposed within the solid phase at which however no transition of oligomers into the gas phase by sublimation is to be observed. According to the invention this temperature lies between 70° C. and 150° C., preferably between 100° C. and 120° C. Only after observing a sufficient duration time of 2 to 6 hours at this temperature is the granulate in a second step heated to the temperature of the solid phase after-condensation at which the desired chain length in the produce is achieved within industrially and economically acceptable times. This after-condensation temperature lies at 170° C. up to 10° C. beneath the melting temperature, preferably at 190° C. to 210° C. After the pre-treatment in the first stage, in the second stage no substantial restitution of oligomers occurs, so that the inert gas remains free of oligomers and therefore no contamination of components of the installation is observed.

This effect is reinforced, by a further feature of the invention, by the fact that, in the fluidised bed reactor, the flow of inert gas and the inlet temperature of the granulate into the reactor are so selected that the temperature of the inert gas leaving the reactor lies below approximately 90° C. This temperature is polymer-specific and more precisely defined by the fact that oligomers which have been obtained by sublimation and desublimation at temperatures beneath the melting point from a specific polymer, generate an endothermic effect during an investigation by DSC (differential scanning calorimetry) in the capital $N_2$ flow and at a heating speed of 10° C./min by beginning sublimation. The so-called onset temperature of this effect, which is obtained by the point of intersection of the tangent at the base line with the tangent on the signal curve after onset of the endothermic effect, forms the upper limit for the exhaust gas temperature from the reactor.

Observance of this temperature in the exhaust gas flow prevents small amounts of oligomers which despite the two-stage procedure, still pass into the inert gas, from depositing on the portions of the installation contacted by the exhaust gas and there forming solid encrustations.

An additional feature of the invention consists in the fact that the inert gas used for after-condensation has a dewpoint temperature between 0° C. and 30° C. It has become apparent that the tendency to form oligomer encrustations on the portions of the installation contacted by the exhaust gas is less as the relative humidity of the exhaust gas becomes higher. A high dewpoint of the inert gas at the same time has the advantage that the product in the case of PA66 shows less yellowing. The dewpoint of the inert gas however cannot be increased at will, as the speed of the chain elongation reaction reduces as the dewpoint temperature increases, so that the required reactor volume for a predetermined product quality becomes too great.

All gases which, at the temperature of the solid phase after-condensation, do not undergo chemical reactions with the polyamide, discolour or otherwise damage it, are suitable as inert gas. Particularly suitable are nitrogen or carbon dioxide, which must be free of oxygen.

BRIEF DESCRIPTION OF THE DRAWING

Embodiments of the present invention will be explained in more detail in conjunction with the annexed drawings, which show.

DETAILED DESCRIPTION OF THE PREFERRED EMBODIMENT

Figure 1:
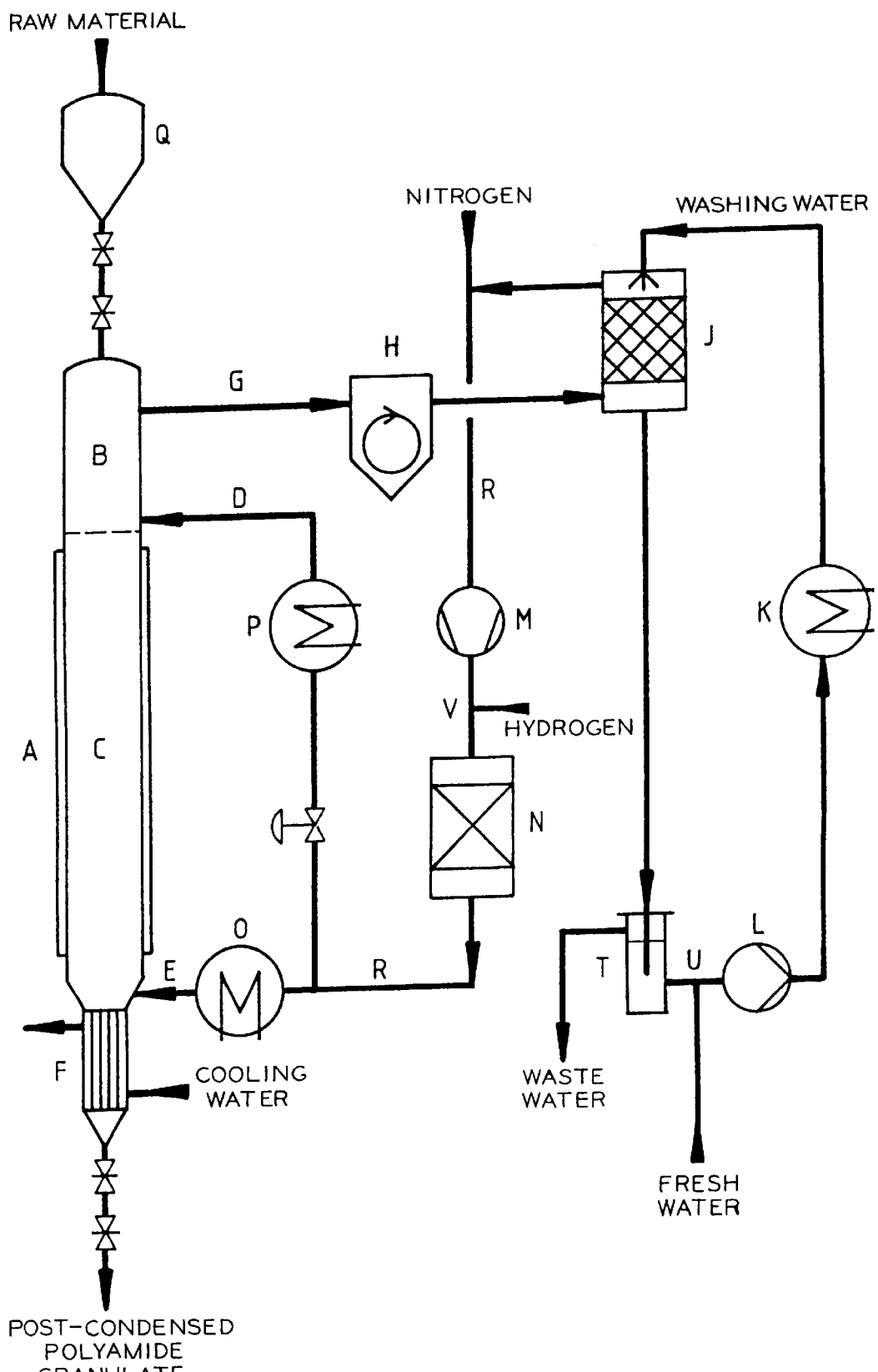
FIG. 1: a first embodiment of a device for carrying out the method according to the invention.

In FIG. 1 there is provided a fluidised bed reactor A, to which is passed, from a raw material container Q, polyamide granulate which has been manufactured from polycondensation of the molten mass with a predetermined relative solution viscosity. The reactor has an upper zone B and a lower zone C, which are heated to different temperatures. An exhaust gas flow G is removed in the upper area of zone B through an exhaust gas nozzle not shown, and in the lower region of the zone B there is a supply means for an first inert gas flow D, and in the lower region of the zone C there is a further supply means for a second inert gas flow B. The supply means for inert gas are respectively connected via heat exchangers P and O to an inert gas pipe R.

Connected to the zone C of the fluidised bed reactor A there is a tubular cooler F, to which cooling water is supplied, and which has an outlet for the after condensed polyamide granulate.

The exhaust gas nozzle is connected to a cyclone H, connected to a gas washer J. The gas washer J is located in a water circuit S, in which there are provided a settling tank T with an outlet for waste water, a fresh water supply U, a pump L and a cooler K. The washer J is connected to the inert gas pipe, in which there is located a pump M and a reactor N filled with palladium catalyst, preceding which is provided an oxygen supply V.

A fluidised bed reactor A according to FIG. 1 is supplied with PA66 granulate at 20° C. In the upper zone of the reactor, zone B, the granulate is heated up in counterflow by an inert gas, preferably nitrogen, to a temperature between 90° C. and 150° C., preferably 110° C. The duration time of the granulate in this zone comes to 2 to 6 hours, preferably 4 hours. The desired temperature of the nitrogen flow is set by the fact that the high-temperature flow rising out of zone C of the reactor is mixed with a second, lower-temperature low D, which is supplied laterally to the reactor and is uniformly distributed over the reaction cross-section by special components. The ratio of the mass flows of the nitrogen to that of the granulate in zone B comes to 2.5 to 15, preferably 3 to 6.

After leaving zone B, the granulate is heated in zone C to a temperature between 180° C. and 230° C., and is after-condensed. The temperature and duration time in this zone depend on the desired average degree of polycondensation of the product. The nitrogen flow E heats the granulate to the after-condensation temperature, and the by-products of the reaction are removed in the fluidised bed reactor A with the rising flow. The mass flow ration of inert gas to granulate in this zone comes to 2.5 to 8, preferably 2.5 to 5. After the duration time predetermined by the desired average degree of polycondensation at the correspondingly predetermined temperature, the product passes into a granulate cooler, where the reaction is determined by cooling to 40° C. The product then leaves the installation.

The nitrogen mass flows E and D are co-ordinated with one another in such a way that, in interaction with the temperature of the granulate entering the reactor, the exhaust gas flow G has a temperature of less than 90° C., preferably 80° C. and lower. The concrete ratio of the mass flows E and D arises with this condition from the simple mass and energy balance of the reactors.

The exhaust gas firstly flows, in order to separate dust, through a cyclone H into a gas washer J, where it is washed with water. Residual polymer dust and decomposition products of the PA66, particularly cyclopentanone, carbon dioxide and traces of ammonia, accumulate in the water. The water is passed in a circuit, a small proportion of fresh water being continuously added and a corresponding amount of waste water being withdrawn. Before its entry into the gas washer J, the wash water is set in cooler K to a temperature between +0° C. and 30° C., preferably 5° C. to 20° C. The amount of wash water thus circulated per unit of time is so selected that the inert gas adopts the inlet temperature of the water into the washer J. In this way the inert gas is not only clean, but the dewpoint temperature is also set. Among other things, the selection of the dewpoint temperature depends on the desired average chain length in the product. Basically, the speed of polycondensation decelerates with increasing dewpoint temperature. It has however become apparent that the yellowing in the product reduces the higher the dewpoint temperature of the inert gas during after-condensation. Accordingly, every purpose aimed at requires a compromise between product colour and reaction speed.

Various examples of the invention will be described in more detail, without however restricting their scope. The characterising polymer properties in these examples are determined according to the measurement methods described in the following.

Relative Solution Viscosity

A solution of the polyamide sample is produced in 96% sulphuric acid. The polymer concentration comes to 1 g/dl. The viscosity of this solution is measured in an Ubbelohde-capillary viscosimeter at 25° C. In the same apparatus, the viscosity of the polymer-free sulphuric acid is measured. The relative solution viscosity of the sample is the quotient of the solution and that of the solvent. It is a measure for the average degree of polycondensation of the average molecular mass of the polyamide sample.

Oligomer Concentration in the Polyamide

The polymer sample is extracted with methanol in a Soxhlet apparatus for a period of 4 hours. The methanol containing extract is condensed, the residue is dried and weighed. The quotient of the amount of residue and of the polymer weight gives the extract content of the polyamide, which is combined from monomers and oligomers. Then the residue is taken up with a 1:1 (volume) mixture of methanol and diluted acetic acid (5 mmol/l) the solution being then filtered. The filtrate is analysed with a high-performance liquid chromatography (HPLC) at 40° C. (column: LiCrosorb RP 18, Company Merck, 250 mm length). The above named mixture of methanol and diluted acetic acid serves as an eluate. Detection of the individual component is effected in UV light at 210 nm. A provisional oligomer concentration arises when the peak surface of an oligomer is set in relation to the sum of all peak surfaces, and the extract content of the polyamide is multiplied by this factor.

EXAMPLE 1

PA66 granulate from a polycondensation of the molten mass with a relative solution viscosity of 2.5 was treated on a laboratory scale at various temperatures and duration times in a vacuum of 0.5 mbar. For this purpose a sample of approximately 20 g was weighed into a glass flask with a ground neck and closed with a ground stopper with a gas removal pipe. A thermometer was passed through the ground stopper, which dips into the granulate bulk and indicates the granulate temperature. The flask was evacuated to a pressure of 0.5 mbar and submerged in a hot oil bath. After submergence of the flask in the oil bath, the temperature rose in less than 10 minutes to the required value. As soon as the provided duration time had expired, the flask was removed from the oil bath and cooled by blowing with compressed air. The vacuum in the flask was then released, the granulate removed and analysed. The test conditions and analysis results are indicated in Table 1. In tests 1 to 3, the samples were treated at a constant temperature. In test 4 the sample was firstly kept at a low temperature level and only after expiry of the indicated duration time $T_1$ was heated to a higher temperature. In this case the sample was then after-condensed during the duration time $T_2$.

TABLE 1

| Test No. | T. in Granulate (°C.) | Duration (h) $t_1$ | $t_2$ | Extract % | K4 % | K6 % | K7 % | Sublimate |
|---|---|---|---|---|---|---|---|---|
| Raw Material | — | — | — | 1.69 | 0.78 | 0.43 | 0.40 | — |
| 1 | 110 | 6 | — | 1.18 | 0.00 | 0.56 | 0.51 | none |

TABLE 1-continued

| Test No. | T. in Granulate (°C.) | Duration (h) $t_1$ | Duration (h) $t_2$ | Extract % | K4 % | K6 % | K7 % | Sublimate |
|---|---|---|---|---|---|---|---|---|
| 2 | 150 | 6 | — | 0.93 | 0.01 | 0.44 | 0.40 | little |
| 3 | 210 | 6 | — | 0.99 | 0.47 | 0.15 | 0.31 | heavy |
| 4 | 110/210 | 4 | 6 | 1.21 | 0.00 | 0.26 | 0.57 | none |

Figure 2:
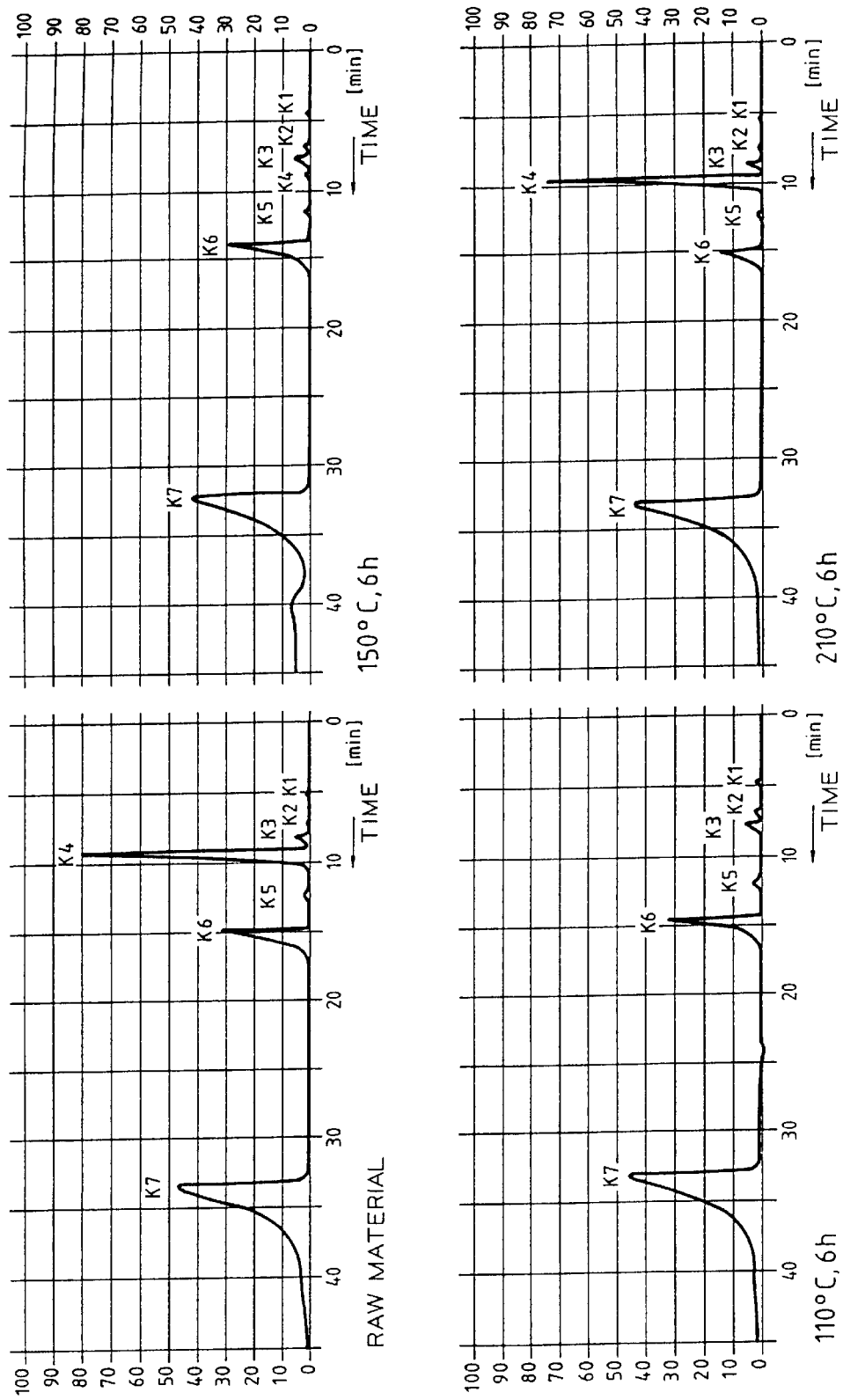
FIG. 2: HPLC diagrams of methanol extract of the polyamide granulate as raw material and after treatment at various temperatures.

In FIG. 2 there are assembled HPLC diagrams of the extract of the raw material and of the samples treated for 6 hours at 110° C., 150° C. and 210° C. The raw material from the polycondensation of the molten mass shows in the HPLC diagram seven clearly-distinguished peaks. No association of these peaks to exactly specified monomers or oligomers was undertaken. They were identified in the sequence of their detection with K1 to K7. Only the oligomers K4, K6 and K7 occur in relevant concentrations. The others are negligible.

K6 and K7 decrease as the treatment temperature rises, as would be expected by the person skilled in the art and familiar with solid phase after-condensation of polyamides. At 0.78% (mass), K4 is the main component in the raw material. After a six-hour treatment at 110° C., this component has disappeared without trace; at 150° C. only traces remain. At 210° C. the concentration of K4 is of the same order of magnitude as in the raw material. Thus K4 reveals the opposite behaviour to K6 and K7. The two-stage treatment at $110^{-°}$ C./210° C. (test 4) surprisingly leads to no noticeable restitution of K4.

Coating of the cold portions of the apparatus with sublimate (oligomers) increases with temperature and with the concentration of the component K4. That means that K4 at 110° C. cannot have escaped by sublimation from the sample, and that K4 is of decisive importance for the formation of coatings on cold surfaces.

EXAMPLE 2

Polyamide 66 granulate with a relative solution viscosity of 2.4, an extract content of 1.69% and a concentration of oligomer component K4 of 0.78% is supplied to a fluidised bed reactor A according to FIG. 1 at a temperature of 20° C. In the upper zone B of the reactor, the granulate is heated with nitrogen in counterflow to a temperature of 110° C. the duration time of the granulate in this zone comes to four hours. The nitrogen flow, with a temperature of 110° C., is produced by lateral introduction of a nitrogen flow D at 70° C. into the reactor and mixture of the same with the hot gas flow emerging from zone C of the reactor. The ratio of the mass flows of gas to granulate in zone B is set at 5.5.

After four hours' duration in zone B, the granulate enters zone C, where a second nitrogen flow heats it to a temperature of 210° C. The mass flow ratio of gas to granulate in this case comes to 3.5. After twenty hours duration time in zone B, the granulate passes into a tubular cooler F. At this point it flows through the tubes, while cooling water flows around said tubes. The granulate leaves the installation at a temperature of below 50° C. It has a relative solution viscosity of 5.2. The extract content comes to 0.40%. HPLC analysis shows that the oligomer component K4 has dropped to less than 0.001%.

The exhaust gas flow G from the reactor has a temperature of 75° C. Dust carried along is separated in the cyclone cap H. In the washer J, the nitrogen is cleaned of the by-product of reaction with water, and a dewpoint of 15° C. in the gas is set. The gas is recompressed by the pump M. Traces of entering oxygen are burned off with introduced hydrogen on a palladium catalyst N, to form water. Thereafter the gas flow is divided into the two flows E and D, flow E being heated by the heat exchanger 0 to 210° C., flow D by the heat exchanger P to 70° C.

After operation for one week, the installation was stopped. T he portions of the installation contacted by the exhaust gas were tested for oligomer deposits. Reactor cover, exhaust gas tube to the cyclone and further to the washer and the cyclone itself and the pump were free of crusty deposits.

EXAMPLE 3

The fluidised bed reactor according to FIG. 1 is operated only with the nitrogen flow E, which enters the apparatus at a temperature of 210° C. The flow D comes to zero. The mass flow ratio of gas to granulate in the overall reactor is 5.5. The exhaust gas adopts a temperature of 115° C. Otherwise the installation is operated as in example 2.

The product has a relative solution viscosity of 5.7. After one week of operation the installation is stopped. The reactor cover, the pipeline to the cyclone and further to the washer are covered with a solidly adhering crust, which is only removed by the exertion of force, for example by means of a steel wire brush. The interior of the pump is also covered with an extremely thin finely granulate layer.

Figure 3:
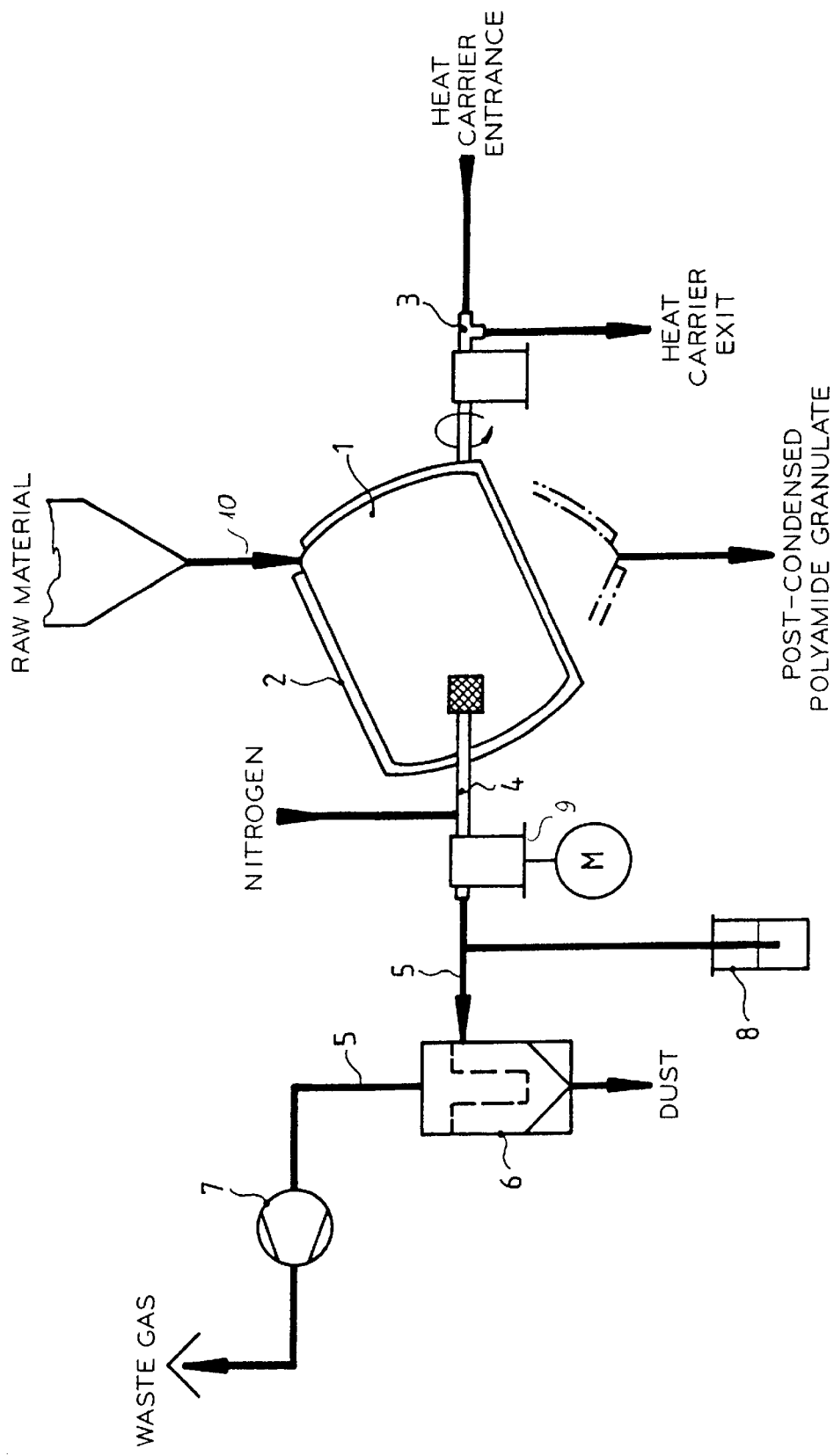
FIG. 3: a further embodiment of a device for carrying out the method according to the invention.

FIG. 3 shows a device for carrying out the method with a tumbler reactor 1. The tumbler reactor 1 has a double jacket 2, which is connected by a heat-transfer oil pipe 3 to a heat transfer medium inlet and a heat-transfer medium outlet concentric therewith. A pipe nozzle 4 provided with a screen serves both to evacuate the reactor 1 and to rinse it with inert gas. A drive system 9 causes the reactor to rotate about the axis formed by tube nozzle 4 and heat-transfer oil pipe 3.

Through a pipeline 5 and a separator 6, the reactor may be evacuated by the vacuum pump 7. Upon inert gas rinsing of the reactor, the gas supplied through the nozzle 4 escapes through an atmospheric bath 8. A nozzle 10 serves both to fill the reactor with granulate and also to empty it.

EXAMPLE 4

The tumbler reactor 1 according to FIG. 3 is filled with 300 kg of PA66 granulate at 20° C. and a moisture content of 0.2%, so that approximately 50% of the container value is taken up with granulate. The granulate has the same properties as the raw material in Example 2.

The apparatus then is closed and is rinsed with nitrogen to remove all oxygen. Heat transfer oil at a temperature of 120° C. flows through the double jacket 2 of the reactor container. Rotation of the container about its diagonal at 0.5 revolutions per minute accelerates heating and mixing of the granulate charge. After four hours the bulk material in the reactor 1 has reached a temperature of 110° C. After a further two hours during which the granulate temperature is maintained at 110° C., the temperature of the heat-carrying medium is increased to 220° C., at which level it is held for fifteen hours. The reactor along with its content is then cooled to 60° C. and emptied. During the entire period between first heating and emptying, the reactor is evacuated to approximately 20 mbar at intervals of an hour, in order to remove water vapour formed by drying and reaction. As soon as approximately 20 mbar are reached, the connection with the vacuum pump is interrupted and the reactor container is flooded with nitrogen until atmospheric pressure is reached. Then a small nitrogen flow is passed through the container, flowing through the atmospheric lock 8 out of the installation.

After the granulate has been removed from the reactor, its inner walls and heating surfaces are metallically bright and covered only by an extremely thin, electrostatically-adhering dust layer, which can be easily removed by blowing with compressed air. The granulate has an extract content of 0.52%. The concentration of the oligomer component K4, according to HPLC analysis, is less than 0.001%.

EXAMPLE 5

During manufacture in the molten mass, PA6 results with approximately 10% of water-extractable components. This proportion is a hindrance for all applications and is always extracted by water to a residue which lies below 1%. During conventional solid phase after-condensation of PA6 extracted in this way, normally the extract proportion remains unaltered or even increases, while the cooler surfaces of the after-condensation installation are covered with sublimate which is difficult to remove. A procedure which reduces the proportion of extract is accordingly advantageous for further processing of the PA6 granulate.

PA6 granulate from polycondensation of the molten mass and having a relative solution viscosity of 2.41 and an extract content of 0.92% was treated on a laboratory scale at various temperatures and duration times in a nitrogen flow. For this purpose a sample of approximately 20 g was weighed into a gas washer flask with frits and closed with a ground cover with a gas inlet and gas outlet pipe. A thermometer was passed through the ground glass cover, penetrating into the bulk granulate and indicating the granulate temperature. The granulate layer in the flask was flowed through the frits with a nitrogen gas flow of 12 l/h. After submerging the flask in a hot oil bath, the temperature rose in less than 10 minutes to the desired value. As soon as the predetermined duration time had expired, the flask was removed from the oil bath and cooled by blowing with compressed air. The flask was then opened, the granulate removed and analysed. The test conditions and analysis results are shown in Table 1. In test 1 and 2, the sample was treated at a constant temperature. In test 3 the sample was firstly kept at a low temperature level, and heated to a higher temperature only after expiry of the indicated duration time $t_1$. At this point the sample was then after-condensed during duration time $t_2$.

The concentrations of the cyclic oligomers in Table 2 were determined by HPLC. Calibration measurements with pure substances were undertaken for caprolactam and the cyclic dimer. Higher oligomers were calculated with the calibration factor for the cyclic dimer.

The measurement results in Table 2 show the advantages of after-condensation of the PA6 in two temperature stages.

The six-hour treatment of the granulate at 150° C. (test 1) reduces the water-extractable proportion from 0.92% to 0.78%. Thus any coating of the cooler portions of the apparatus with sublimate is scarcely noticeable. Caprolactam and cyclic oligomers accordingly cannot have escaped in notable amounts from the granulate. The relative solution viscosity increases only slightly, because the temperature is too low for a solid phase after-condensation.

If the granulate is treated in a single temperature stage at 190° C. (test 2), the relative solution viscosity rises in six hours to 2.94, yet the extract proportion does not noticeably decrease. Only the treatment in two temperature stages (test 3) unifies an increase in relative solution viscosity usable in practice with a clear reduction in the extract proportion. Coating of the cold apparatus portions with sublimate was in this case less than in test 2. The lower extract proportion in test 3 cannot have been caused therefore by more intense sublimation.

TABLE 2

| Test No. | T. in Granulate (°C.) | Duration (h) $t_1$ | $t_2$ | Extract % | Caprolactam % | cykl. Dimer % | cykl. Trimer % | cykl. Tetramer % | Sublimate | ηrel. |
|---|---|---|---|---|---|---|---|---|---|---|
| Raw Material | — | — | — | 0.92 | 0.18 | 0.10 | 0.32 | 0.22 | — | 2.41 |
| 1 | 150 | 6 | — | 0.78 | 0.20 | 0.10 | 0.26 | 0.22 | scarcely | 2.52 |
| 2 | 190 | 6 | — | 0.65 | 0.21 | 0.13 | 0.21 | 0.22 | heavy | 2.94 |
| 3 | 150/190 | 6 | 6 | 0.65 | 0.21 | 0.08 | 0.16 | 0.13 | medium | 2.97 |

The caprolactam content is influenced by the type of test procedure and in all tests, lies close to the value in the raw material. The procedure with two temperature levels (test 3) leads to a clearly reduced concentration of the cyclic oligomers in comparison to test 2 and in particular to the raw material. This is of importance for coating formation and contamination in industrial plant. While coating with caprolactam can easily be prevented by heating the reactor walls and pipelines at temperatures close to the process temperatures, due to the considerably lower vapour pressure, this is not possible in the case of the cyclic oligomers. The temperatures necessary for this would be uneconomically high and would lead to decomposition of the material carried along in the exhaust gas, and would thus lead to more intense pollution.

We claim:

1. Method of manufacturing polyamide, comprising:
   (a) producing a polyamide granulate by melt phase polycondensation; and
   (b) post-condensing said polyamide granulate in the solid state by
      (1) heating said polyamide granulate to a first temperature, from about 70° C. to about 150° C., and maintaining said first temperature for a predetermined period of time sufficient to decompose oligomers present with the polyamide granulate, and (2) subsequently heating said polyamide granulate to a second temperature until the desired average degree of polycondensation is achieved, said second temperature from about 170° C. to about 10° C. below the melting point of said polyamide.

2. Method according to claim 1, wherein said predetermined period of time is from about 2 to about 6 hours.

3. Method according to claim 1, wherein post-condensation is performed in an inert gas flow or under vacuum.

4. Method according to claim 3, wherein said inert gas used for post-condensation has a dewpoint temperature from about 0° C. to about 30° C.

5. Method according to claim 1, wherein step (b) is performed continuously in a moving bed reactor, said polyamide granulate first flowing in contact with an inert gas of a first mass flow and a first temperature through a low temperature zone of the reactor, and then in contact with an inert gas of a second mass flow and a second temperature through a high temperature zone of the reactor, said second temperature being higher than said first temperature.

6. Method according to claim 5, wherein said first and second mass flows and said first and second temperatures of said inert gases and a mass flow and a inlet temperature of said polyamide granulate are selected such that an exhaust gas temperature is less than 90° C.

7. Method according to claim 1, wherein step (b) is performed intermittently in a tumbler, biconical, or drum reactor.

8. Method according to claim 7, wherein the reactor is evacuated in intervals and flooded with nitrogen.

9. Method according to claim 1, wherein step (b) is performed continuously, said polyamide granulate flowing during step (b)(1) in contact with an inert gas of a first temperature and during step (b)(2) in contact with an inert gas of a second temperature.

10. Method according to claim 9, wherein a mass flow rate of said inert gas of a first temperature in relation to a mass flow rate of said polyamid granulate is 2.5 to 15 and a mass flow rate of said inert gas of a second temperature in relation to that of said polyamide granulate is 2.5 to 8.

11. Method according to claim 9, wherein said inert gases having flown in contact with said polyamide granulate are cleansed from by-products by separating dust from said inert gases and by subsequently flowing in contact with a wash water, thereby a dewpoint temperature of said inert gases being set.

12. Method according to claim 11, wherein the cleaned inert gases are fed back to flow in contact with said polyamide granulate again.

13. Method according to claim 3, wherein said inert gas used for the post-condensation has a dewpoint temperature between 5° C. and 20° C.

14. Method of manufacturing polyamide, comprising:
(a) producing a polyamide granulate by melt phase polycondensation; and
(b) post-condensing said polyamide granulate in the solid state, while continuously transporting it from a first zone to a second zone, by
   (1) heating said polyamide granulate by contacting it in said first zone with an inert gas of a first temperature, the polyamide granulate remaining in said first zone for a predetermined time sufficient to decompose oligomers present with said polyamide granulate, and
   (2) subsequently heating said polyamide granulate by contacting it in said second zone with an inert gas of a second temperature, said polyamide granulate remaining in said second zone until the desired average degree of polycondensation is achieved, said second temperature is above said first temperature and below the melting point of said polyamide.

* * * * *